Figure 1:
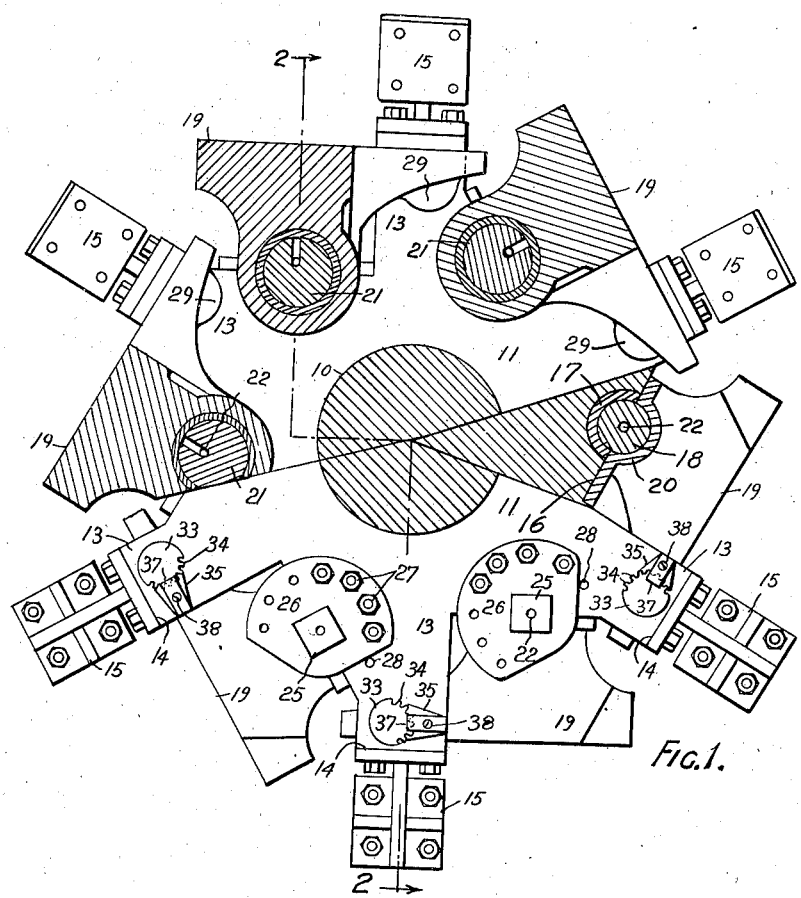

Nov. 18, 1941.　　　F. M. CHAPMAN　　　2,263,203
DRIVING TUMBLER FOR BUCKET DREDGERS
Filed Aug. 14, 1939　　2 Sheets-Sheet 1

Inventor
Frank Morrice Chapman
By Singer, Ehlert, Storg & Carlbom
Attys.

Nov. 18, 1941.            F. M. CHAPMAN            2,263,203
               DRIVING TUMBLER FOR BUCKET DREDGERS
                     Filed Aug. 14, 1939            2 Sheets-Sheet 2

Inventor
Frank Maurice Chapman
By
Linger, Ehlert, Stern & Carlberg
attys.

Patented Nov. 18, 1941

2,263,203

UNITED STATES PATENT OFFICE 2,263,203

DRIVING TUMBLER FOR BUCKET DREDGERS

Frank Morrice Chapman, Kuala Lumpur, Selangor, Federated Malay States

Application August 14, 1939, Serial No. 290,085 In the Federated Malay States August 19, 1938

1 Claim. (Cl. 74—243)

This invention relates to the top, or driving, tumbler of bucket dredgers and like equipment, such as bucket conveyors and endless track mechanisms, wherein a link band is driven by a tumbler. The invention is hereinafter described with reference to a bucket dredger.

In the past bucket dredger top tumblers, made either with a cast steel body and a forged steel shaft or as integral steel castings, have generally been fitted with removable steel tread wearing plates. When the tumbler, buckets, bucket pins and bucket bushes are all new the bucket chain fits the tumbler tread tightly and when the mechanism is in operation under such conditions no slipping occurs between the bucket treads and the tumbler tread wearing plates upon which the buckets sit. However, due to the movement of the bucket band, the bucket pins and bushes soon wear slack and the pitch of the buckets increases. With this condition, slipping takes place between the bucket tread and the tumbler tread plate on which it sits and if such slipping is not prevented in its early stages by increasing the size, i. e., the perimeter, of the tumbler tread, then the wear on both the bucket treads and the tumbler tread plates increases rapidly. A limit is reached when the tumbler tread as a whole slips in the bucket band and refuses to drive it or, alternatively, heavy wear takes place at the rear of the bucket treads and under the bucket back eyes, causing the back eyes to crack and the buckets to be discarded as unsafe. Further, the tumbler tread faces under the tread plates tend to wear and distort at the same time.

Up to the present time the size or perimeter of a tumbler tread has usually been increased either by adding packing plates of various thicknesses under the tumbler tread plates, or by fitting tumbler tread plates of various appropriate thicknesses. The required increase in the size or perimeter of the tumbler tread must be determined from time to time, and this will vary according to the amount of wear which has taken place on bucket pins, bushes and treads. In order to insure that the tumbler tread is at all times a reasonably good fit for the bucket chain, it is necessary to have available a large range of packing plates or tumbler tread plates of varying thicknesses.

Moreover, the difficulty of replacing, or packing, the tread plates without removing the bucket band, is apparent.

The object of this invention is to provide a tumbler, the tread size or perimeter of which can be readily adjusted without the use of packing or fresh tread plates, and without removing the bucket band from the tumbler. Moreover, a fine adjustment of the perimeter can be obtained and, if desired, the perimeter can also be varied to suit any particular bucket chain. Other incidental advantages will appear from the following description.

Figure 2:
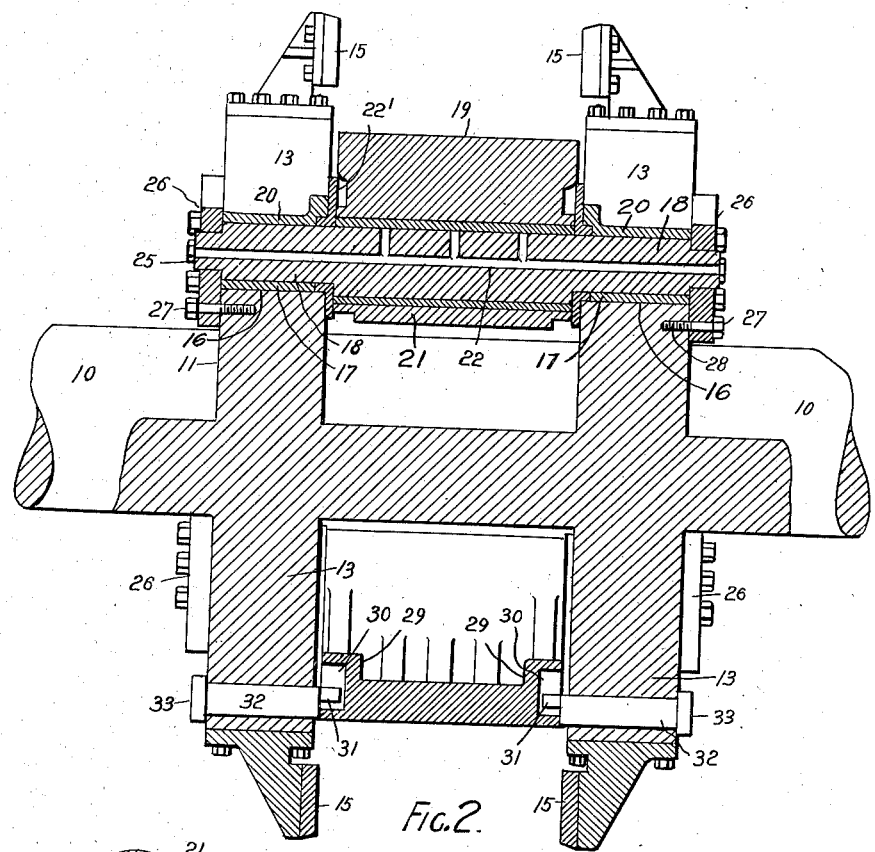
Figure 3:
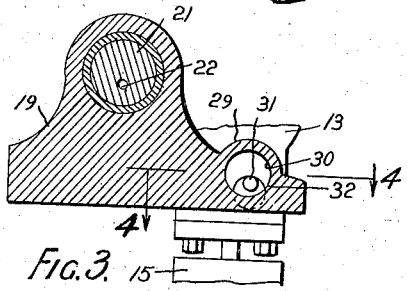
Figure 4:
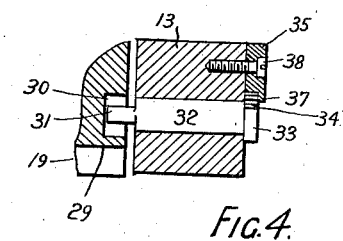
Figure 5:
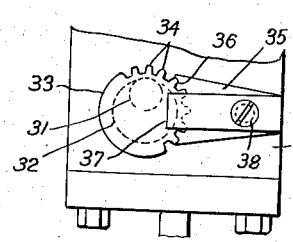

The drawings illustrate a preferred construction of the tumbler and in these drawings:

Fig. 1 is an end elevation of the tumbler, partly cross-sectioned,

Fig. 2 is a longitudinal cross-sectional elevation, taken on staggered line 2—2 of Fig. 1, Fig. 3 is a side cross-sectional elevation of a tread plate incorporating the retaining means for the tread plate, Fig. 4 is a fragmentary cross-sectional plan, taken on line 4—4 of Fig. 3, illustrating the said retaining means for the tread plate, and Fig. 5 is an end elevation of the locking means for the retaining pin of Figs. 1 to 4.

The construction as shown in Figs. 1 and 2 comprises a tumbler shaft 10 on which are formed two spaced irregular flanges 11, 11 (Fig. 2). Each flange 11 is formed with six symmetrically disposed shoulders 13, 13, each having an outer face 14 to which is bolted a side bracket 15, and an inclined face 16 (Fig. 1) which is formed with a half-bearing 17 to receive one end of the pin 18 of the associated tread plate 19. The bearing 17 is completed by a cap 20.

As will be seen from Fig. 2, each pin 18 is mounted at its ends in the opposite shoulders 13, 13 of the side flanges 11, 11 and intermediate these flanges the pin is formed with an eccentricity 21 on which is oscillatably mounted the associated tread plate 19. The pin 18 is formed with lubrication passages 22, and wearing washers 22¹, 22¹ (Fig. 2) are disposed about the ends of the pin between the shoulders 13 and the tread plate 19.

Each extreme end of each pin 18 is fitted with similar locking means, one of which is now described. The end of the pin is formed with a square head 25 over which is neatly engaged a locking plate 26. The locking plate 26 is adjustably secured to shoulder 13 by bolts 27, 27 which are selectively engaged in threaded apertures 28, 28 in the shoulder, so that the locking plate may be rotated to the desired position and locked therein to retain the eccentricity 21 in adjusted rotational position.

Therefore, as illustrated in Fig. 1, the tumbler comprises a shaft 10 carrying six equally spaced tread plates 19 which are oscillatably mounted on pins carried by spaced flanges 11, 11, and each tread plate is adapted to cooperate with a pair of side supporting brackets 15, 15.

In use, a slight oscillation of the tread plates 19, 19 on their pins 18, 18 assists in effecting smooth engagement and disengagement of each tread plate in succession under succeeding buckets. In the drawings the tread plates 19, 19 are illustrated in the fully retracted position. As wear occurs and it is desired to increase the perimeter of the tumbler treads to compensate therefor, or when fitting the tumbler initially, each tread plate 19 is adjusted by removing the bolts 27, 27 from the locking plate 26, rotating the pin 18 to the requisite degree to cause the eccentricity 21 to move the tread plate outwardly, and relocking the locking plate 26 in adjusted position. If the eccentricity 21 is in the fully retracted position (Fig. 2) rotation of the pin 18 in either direction will move the tread plate 19 further from the centre of the tumbler. Rotation of the pin 18 will also cause a slight tangential movement of the tread plate 19 on the tumbler, which movement may be of advantage in a worn bucket band.

For limiting the oscillations of the tread plates 19 the nose of each tread plate 19 is formed at either side with a hump 29 housing a recess 30 into which is engaged a locating stub 31 formed eccentrically on a pin 32 rotatably mounted through the adjacent shoulder 13. A head 33 (Figs. 4 and 5) is formed on each pin 32, and this head is formed with teeth 34, 34. A keeper plate 35, formed with teeth 36, 36 to engage teeth 34, 34 of the head 33, and with a retaining finger 37 to overlie the head, is detachably secured to shoulder 13 in engagement with the head 33, by means of a set screw 38.

In the drawings the locating stubs 31 are shown in fully retracted position, in conformity with a similar position of pins 18. It will be understood that the tread plates 19 can oscillate somewhat on their pins, and such oscillation is limited by the contact of either side of apertures 30 on the retaining stubs 31.

When the pins 18 are rotated to adjust the perimeter of the tumbler, pins 32 are similarly rotated (in the same sense) to maintain the nose of the tread plates 19 in the correct position. To rotate pins 32, the keeper plates 35 are removed, the pins adjusted, and the keeper plates replaced.

The invention provides a tumbler the perimeter of which can be readily and accurately adjusted, even without removing the band.

I claim:

A tumbler for a link band comprising a tumbler shaft formed with two spaced and opposed flanges, a plurality of tread units symmetrically disposed between said flanges, each of said units comprising a tread plate oscillatably mounted on a pin formed with eccentric ends which are rotatably mounted in the opposed flanges, locking means for retaining said pins in adjusted rotational position in said flanges, and means for limiting the oscillation of the tread plates on the said pins, which limiting means comprises a recess formed in each of said tread plates, and a locating stub mounted eccentrically on a pin adjustably carried in one of the flanges engaged in said recess.

FRANK MORRICE CHAPMAN.